United States Patent [19]
Cornelius

[11] 3,710,778
[45] Jan. 16, 1973

[54] BLOOD GAS SENSOR AMPLIFIER AND TESTING SYSTEM

[75] Inventor: Frank L. Cornelius, Milwaukee, Wis.

[73] Assignee: General Electric Company

[22] Filed: March 15, 1971

[21] Appl. No.: 124,364

[52] U.S. Cl.....................128/2 G, 73/23 R, 128/2 E, 128/2.1 E, 204/195 B, 324/30 R
[51] Int. Cl. ..............................................A61b 5/05
[58] Field of Search.....128/2 E, 2 G, 2 R, 2 L, 2.1 E; 204/195 P; 324/30 R; 73/23 R

[56] References Cited

UNITED STATES PATENTS

| | | | |
|---|---|---|---|
| 3,514,377 | 5/1970 | Spacil et al. | 204/1 |
| 3,572,315 | 3/1971 | Cullen | 128/2 E |
| 3,605,728 | 9/1971 | Ogle | 128/2.1 E X |
| 2,886,770 | 5/1959 | Jackson, Jr. et al. | 324/30 R |
| 2,764,892 | 10/1956 | Rosenthal | 324/30 R X |
| 3,430,130 | 2/1969 | Schneider | 324/30 R |

*Primary Examiner*—Kyle L. Howell
*Attorney*—Arthur V. Puccini, Frank L. Neuhauser, Oscar B. Waddell, Joseph B. Forman and Jon Carl Gealow

[57] ABSTRACT

The invention includes an amplifier for processing the output signal from an in vivo sensor for the partial pressure of gas in blood. Means are provided to protect the patient from excess currents and voltages. The first amplifying stage has a floating ground and is at substantially the same potential as the sensor. The output of this stage is chopped with a field effect transistor that derives its control voltage from a transformer which is driven at high frequency and which has high impedance or low leakage at power line frequencies. The chopped amplifier output signal is passed through another transformer which closely couples high frequencies. The amplified signal is demodulated by another field effect transistor in the secondary of this transformer after which the signal is further processed in circuitry that need not be isolated from ground. Means are provided for displaying the signal in terms of partial pressure of the gas in millimeters of mercury. The system includes means for testing the integrity of the sensor before and continuously after it is implanted in the body. Means are also provided for calibrating the sensor under known conditions which are conveniently established.

12 Claims, 6 Drawing Figures

INVENTOR
FRANK L. CORNELIUS

BY

ATTORNEYS

BLOOD GAS SENSOR AMPLIFIER AND TESTING SYSTEM

BACKGROUND OF THE INVENTION

The partial pressure of blood gases such as carbon dioxide and oxygen have been measured in vitro with potentiometric and polarographic sensors for many years. There have been recent advancements in the characteristics and configurations of blood gas sensors which adapt them for in vivo use, thereby permitting monitoring of the partial pressure of these gases as well as the pH of blood on a continuous basis during anesthesia and other medical procedures. An example of a recently developed in vivo sensor for the partial pressure of carbon dioxide is given in the copending application of R. A. Macur, Ser. No. 110957, filed on Jan. 29, 1971 which is assigned to the assignee of this application. The sensor described in that application is exemplary of the type that can be tested, calibrated, utilized and continuously monitored for operability by the apparatus and methods constituting the present invention.

The blood carbon dioxide partial pressure sensor disclosed in the above-cited pending patent application is characterized by a sensing element which is about 30 mils in diameter and a few inches long. This sensor may be disposed in a cannula which has pierced a blood vessel so that the tip of the sensor is exposed to flowing blood. The sensor comprises a fine core wire which is pH sensitive and whose distal end extends beyond the surrounding silver tube which is chlorided and serves as a reference electrode. The tip or distal end of the sensor is surrounded by a thin membrane which encapsulates an electrolyte that contacts the reference and sensing electrodes. The membrane is impermeable to ions but permeable to carbon dioxide from the blood. When carbon dioxide flows in or out of the membrane there are changes in the hydrogen ion concentration. Therefore, pH of the electrolyte changes. This pH change produces varying electric signals which are processed and result in a display of partial pressure in terms of millimeters of mercury.

After sensors of this type are made and tested, they are inserted in a sealed tube which is filled with an electrolyte that is isotonic with the electrolyte of the sensor. The sensors are stored in this condition in a gas mixture which has oxygen and carbon dioxide components at predetermined partial pressures that are close to the pressures of these gases which exist in the blood of the average patient. The electrolyte filled tube is permeable to the gas for which the sensor is designed, such as carbon dioxide, in which case the isotonic electrolyte equilibrates under the storage conditions at a partial pressure of carbon dioxide which corresponds with the partial pressure of that gas in the mixture. Thus, the sensor may be calibrated while it remains in the tube filled with the isotonic electrolyte at a known partial pressure of carbon dioxide.

The electrolyte-filled sensor encasing tube has a conductor which extends from the isotonic electrolyte to the exterior of the tube. For instance, there may be a wire extending through the tube wall which connects with a metal coating on the outside of the tube. This provides means for checking the integrity of the sensor before it is inserted in the patient and even before it is removed from the tube. The signal processing apparatus constituting the present invention is equipped with an exposed terminal. While the sensor is in the tube, its metalized conductive area is touched on this terminal in which case it produces a visible or audible signal if the sensor is defective such as would be the case if its carbon dioxide permeable membrane had developed a pinhole.

The new monitor also permits the sensor to be calibrated at body temperature while the sensor remains in the tube in an equilibrated state which is close to the partial pressure of carbon dioxide that exists in the blood of the average patient. For this purpose, the monitor is equipped with heating sockets which are maintained at normal body temperature and in which the tube-encased sensor may be deposited during the calibration procedure. This permits calibrating any individual sensor under known temperature and partial pressure conditions and permits introducing a suitable correction for possible output voltage differences between individual sensors as they come off the production line.

The new monitor permits avoidance of the prior art procedures for calibrating partial pressure sensors which involved dipping the sensor into two gas mixture or freshly prepared fluids which had been charged with the appropriate gaseous components at a known partial pressure. This old method is disadvantageous not only because it entails preparing and handling a fresh batch of calibrating sample before each calibrating operation but also because it did not allow calibration of the sensor while maintaining its sterility.

SUMMARY OF THE INVENTION

Objects of this invention include providing a monitor that will facilitate calibrating and checking the electric integrity and operability of a partial pressure sensor before the sensor is inserted in the body.

A further object of this invention is to provide a monitor which produces an indication if an in vivo sensor becomes inoperative during use. A corollary to this object is the provision of means for limiting current flow through the body to a very small magnitude in the event of sensor failure.

Another object is to provide a monitor that will isolate a patient who has a sensor implanted from any extraneous power line currents incidental to an electrical breakdown or accident with some other equipment in the vicinity of the patient.

A further object and feature of the invention is the provision of means for correcting and accounting for differences in gain or output voltage versus partial pressure that inevitably occur in mass produced items of this type.

How the foregoing general objects and other more specific objects of this invention are achieved will appear from time to time throughout the course of the ensuing description of the invention.

Briefly stated, the invention is characterized by the use of a first stage, isolation amplifier to the input terminals of which a partial pressure sensor may be connected. The output signals of this amplifier are chopped and transformed and then demodulated before passing through an ensuing signal processing stage. The transformer has close coupling for high frequencies but high impedance or low leakage for low frequencies in which case power line leakage currents of significant magnitude will not pass through the amplifier and sensor to the patient or vice versa. The chopper or modulator is also driven from the secondary side of a high frequency transformer which has coupling properties similar to those on the transformer just discussed, in which case stray power line currents cannot pass through the amplifier and sensor. The demodulated sensor signal is further processed in an amplifier which is subject to having its offset or bias controlled in correspondence with the temperature of the sensor. Means are also provided for matching the gain of the amplifier to the gain of the sensor. Means are provided too for adjusting the offset or bias of the amplifier so that the numerical value displayed on a digital readout agrees with the actual partial pressure of the gas that exists in the fluid-filled tube during calibration. A high frequency is constantly applied across the sensor and a tuned circuit. If the sensor fails, the voltage on the tuned circuit changes and a warning signal results.

The monitor is also provided with one or more temperature controlled sockets in which the sensor may be placed and temperature equilibrated during calibration.

An illustrative embodiment of the new blood gas partial pressure monitor will now be described in greater detail in reference to the drawings.

DESCRIPTION OF A PREFERRED EMBODIMENT

Figure 1:
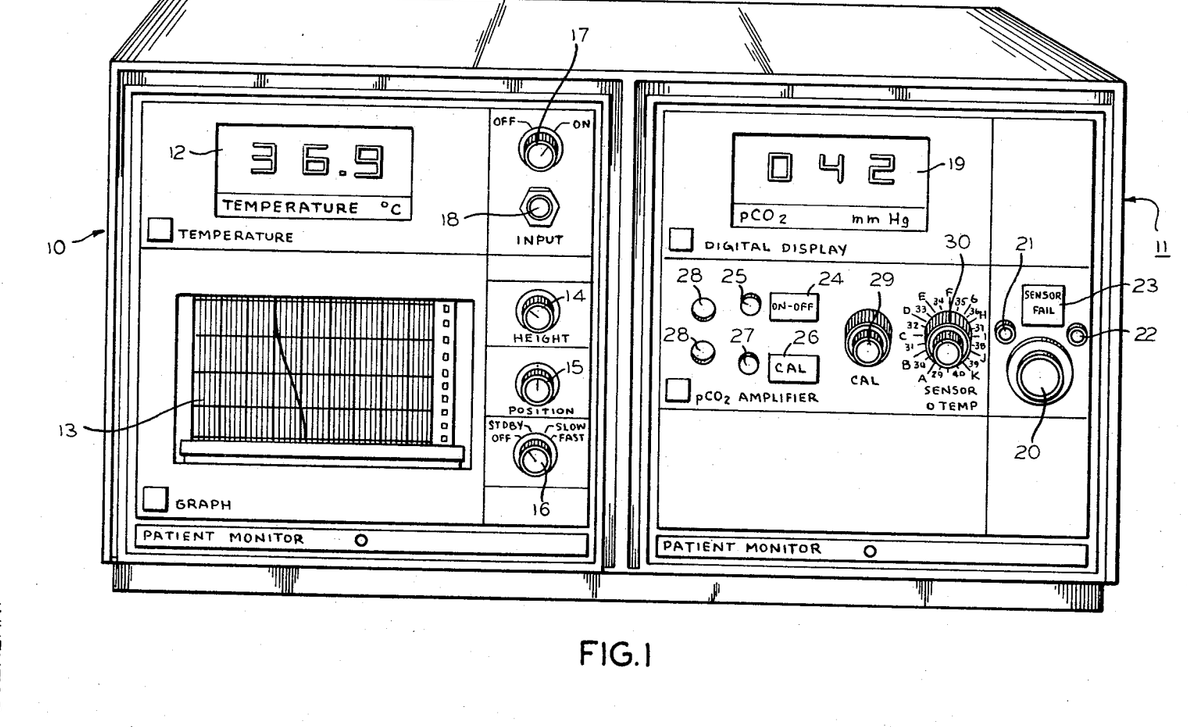
FIG. 1 is frontal perspective view of a blood gas monitoring device embodying the invention.

A monitor comprising a body temperature measuring module 10 and a blood gas partial pressure measuring module 11 is shown in FIG. 1. The temperature module is an adjunct to measuring blood gas pressure but forms no part of the present invention. The temperature module has a digital display of temperature as indicated by the numeral 12. There is also an on-off switch 17 and a jack plug 18 to which the leads of a body temperature sensing probe, not shown, may be connected. The temperature module provides an indication of body temperature which is of significant medical value in itself and is useful for calibrating the partial pressure measuring module 11. Below temperature module 10 is a chart recorder 13 for displaying and recording partial pressure of blood gas. The recorder 13 has associated height and position controls 14 and 15 and a response speed control switch 16.

The gas partial pressure measuring module 11 has some components on its front panel which will be mentioned generally now and discussed specifically later in connection with describing the circuit diagram in FIG. 2. The upper section of module 11 has a window 19 in which there is a digital display of partial pressure of a blood gas such as carbon dioxide expressed in terms of millimeters of mercury. The middle section of the module 11 has a socket 20 by means of which the patient lead to the blood gas sensor may be connected. Also provided is a small socket 21 to which the sensor and a short lead section which is attached to it may be connected during the calibration procedure. Adjacent these sockets is an insulatingly mounted metal test terminal 22. This terminal 22 is exposed so that it may be contacted by the metalized tip of the tube in which the sensor is stored before use to check the electrical integrity of the sensor. If the sensor is defective when terminal 22 is contacted, a sensor fail light 23 will go on and the sensor is not calibrated but is discarded.

The front panel of module 11 also has a switch button 24 for controlling power to the circuitry within the module. The glow of a lamp 25 indicates when switch 24 is in its on position. Also provided is a calibrating button 26 which is depressed when calibration of a sensor is to be undertaken. When Cal button 26 is depressed, an indicator lamp 27 first comes on with diminished brightness which is maintained for a predetermined warm-up period such as about 5 minutes. After this period, the lamp goes on brighter indicating that calibration adjustments may commence. When the time allowed for calibration expires, indicator lamp 27 goes off and the sensor must be reequilibrated if calibration is not complete.

There are also a pair of sockets 28 the interiors of which are maintained at body temperature when the apparatus is turned on. A sensor contained in a tube filled with an electrolyte of known gaseous partial pressure components may be deposited in either of these sockets and raised to body temperature during the calibration procedure.

A calibration gain control knob 29 appears on the front panel of module 11 and is turned in an appropriate direction for making both the digital readout 19 and recorder 13 conform to the known partial pressure of the gas being measured in the electrolyte-filled tube which encases the sensor when it is in a heating socket 28 as is the case during calibration.

There is also a dual or concentric knob switch 30 which is surrounded by alphabetic and numerical graduations as shown. After a sensor is manufactured, it is tested for its intrinsic gain in terms of output voltage versus a gas of known partial pressure in a sample fluid and classified from A to K depending on its particular output voltage. The indicator mark on knob 30 is turned to a letter on the circular scale which surrounds it that corresponds with the letter which is stamped on the envelope containing the sensor. The gain of one of the amplifier stages in the module is thereby adjusted to match the gain of the amplifier to the gain of the sensor. When the sensor is inserted in the blood stream, body temperature is observed on module 10 and knob 30 is turned to cause correspondence between body temperature and the temperature on the scale surrounding the knob. This also affects an amplifier offset or zero change which corrects for departures from the standard calibrating temperature.

Figure 3:
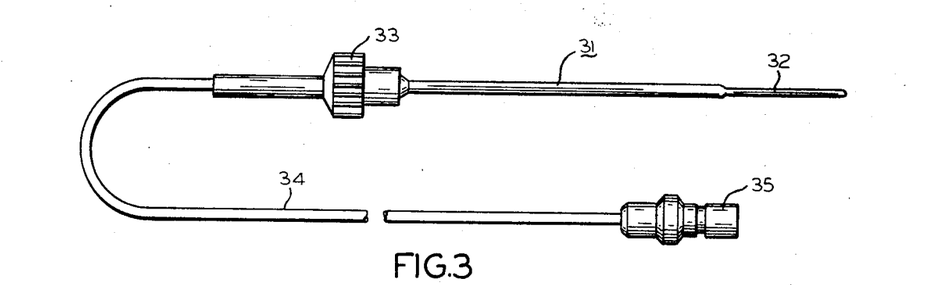
FIG. 3 is a plan view of one type of blood gas partial pressure sensor which may be used with the invention.

A typical sensor which may be tested and used with module 11 is depicted in FIG. 3. The sensor is generally indicated by the reference numeral 31. Its distal end or tip 32 has a reduced diameter the construction of which will be described to the extent necessary hereinafter in connection with FIG. 4. The sensor has a Luer lock adapter 33 for engaging it with the open end of a cannula, not shown, which pierces a blood vessel and admits the distal end 32 of the sensor into the blood stream. Attached to the sensor is a short length of co-axial cable 34 which terminates in a connector 35. This connector may be inserted temporarily in connector socket 21 of module 11 during the calibration procedure and it may then be detached and promptly attached to the end of the longer patient cable which terminates in a suitable mating connector, not shown.

Figure 5:
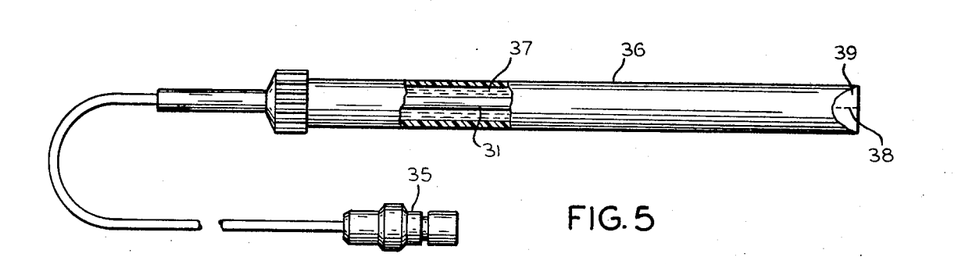
FIG. 5 shows a sensor encased in a plastic liquid tight but gas permeable plastic tube which is filled with electrolyte.

After manufacture and testing, the carbon dioxide sensor shown in FIG. 3 is inserted in a plastic tube 36 which has moderate gas permeability and is shown in FIG. 5. This tube is filled with an electrolyte 37 which is isotonic with the electrolyte inside of membrane 48 in the distal end 32 of the sensor. At an end of liquid impermeable and gas permeable tube 36 is a wire 38 which is sealed in the tip of the tube and extends to a metal coating 39 which is deposited on the outside of the tip. This provides a conductive path from the outside of tube 36 to the sensor 31 on its inside. Preliminary to undertaking the calibrating procedure, connector 35 of the sensor is plugged into socket 21 in module 11 while the sensor remains encased in liquid-filled tube 36. The metalized tip 39 of the tube is then contacted on sensor test terminal 22 of the front of module 11. If the sensor is electrically defective, the sensor-fail lamp 23 will light to indicate this condition in which case the sensor is discarded and another one is tested in a similar manner prior to calibration. This precludes wasting time calibrating a defective sensor or inserting one in a patient and having to withdraw it under the extenuating circumstances of a surgical procedure.

Figure 4:
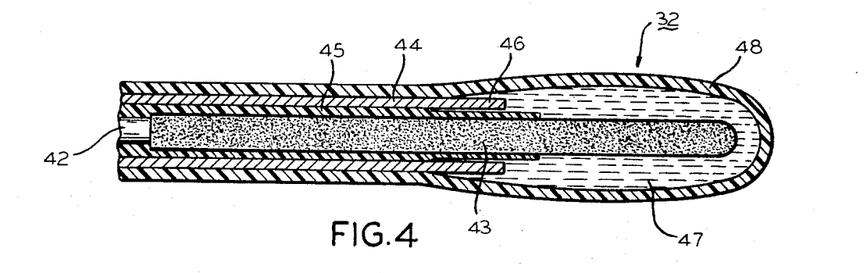
FIG. 4 is a magnified longitudinal cross sectional view of the distal end of the blood gas partial pressure sensor depicted in the preceding figure.

The magnified cross section of the sensor tip 32 will now be briefly discussed in reference to FIG. 4. The tip 32 comprises a central core wire 42 which is palladium or iridium in this example and in the cited copending application. The end region of wire 42 has a coating 43 of the oxide of the metal which comprises core wire 42. This oxide-coated wire constitutes a pH sensitive half cell. Concentric with core wire 42 is a silver tube 44 which is spaced from the wire by an insulating layer 45. In the region 46 silver tube 44 is coated with silver chloride. The silver tube and chloride thus constitute a reference half cell. After the components described are dipped into a sodium chloride and sodium bicarbonate electrolyte solution which adheres and forms a film 47, a membrane 48 is formed over the film and the rest of the sensor extending back to under adapter 33, by dipping the wetted tip into a polymer which is dissolved in a volatile solvent. The solvent evaporates and forms a carbon dioxide permeable, ion impermeable membrane 48. The outer surface of this membrane is exposed to the blood and transmits carbon dioxide to and from electrolyte 47. The carbon dioxide reacts with the water in the electrolyte to form bicarbonate ions and hydrogen ions the latter of which change the pH of the electrolyte in correspondence with the partial pressure of carbon dioxide of the blood. The potential between the reference and sensing electrodes just described varies logarithmically with the partial pressure of carbon dioxide and it is the resulting current that produces a potential which is measured and finally displayed as a linear analog of partial pressure by means of module 11 and recorder 13.

The most common mode of failure of the sensor is for membrane 48 to rupture in which case the conductivity of the sensor would increase since the membrane is a good insulator. Moreover, the sensor will produce erroneous signals when the membrane is ruptured. Hence, during the period between manufacture and calibration for use, the sensor is kept in fluid-filled tube 36 to protect the membrane, to maintain its sterility, to assure that the electrolyte will not dehydrate and to provide a means for gas equilibrating and pretesting the sensor before calibration. The tube-encased sensor is also held in a sterile gas permeable envelope, not shown, a number of which are stored on the user's premises in a gas ambient of known carbon dioxide partial pressure. This results in the electrolyte within tube 36 becoming gas equilibrated with the ambient and permits calibrating the sensor with a captured sample of a standardized fluid.

The electric circuitry of the blood gas monitor will now be described in greater detail in reference to the schematic diagram of FIG. 2. In this figure, sensor 31 is shown connected by means of coaxial cable 34 to the terminals of either socket 21 or 20 which appears on the front panel of module 11. The sensor is thereby connected to the input terminal of an isolation amplifier 51 which, in this case, has a voltage gain of about 5. Maximum sensor current is about $10^{-13}$ amps but more usually is about $3 \times 10^{-14}$ amps. Therefore, amplifier 51 should have a high input impedance such as about $10^{14}$ ohms. The amplifier feedback circuitry is merely symbolized by the conductor 52 as this circuitry can be designed by a skilled electronics designer. Amplifier 51 has a floating ground and its power terminals 53 and 54 are supplied from a voltage regulator 55 which also has a floating ground as will be explained in greater detail later. All floating ground points are symbolized by a small triangle in the drawings to distinguish them from true ground. The unidirectional output current signals from sensor 31 produce on the input of amplifier 51 voltage signals that are proportional to the logarithm of the partial gas pressure sensed by sensor 31.

The output signals from isolation amplifier 51 appear on a filter capacitor 56 and terminal 57. These unidirectional output signals are applied to a field effect transistor 58 which acts as a chopper. Potential for driving this chopper is applied to its gate terminal 59 by means of a conductor 60 which in this example is connected to a 25 KHz driving source that will be discussed in more detail a little later.

The chopped signals from transistor 58 are delivered to the primary winding 61 of a transformer 62. This transformer closely couples 25 KHz signals to its secondary winding 63 but exhibits loose coupling to 60 Hz power line frequencies. Thus, voltages applied to primary winding 61 at power line frequencies will not be coupled into the secondary winding 63 nor will they find a current path to power line ground.

Shunted across primary winding 61 and secondary winding 63 are pairs of oppositely poled zener diodes 64 and 65, respectively, which hold the voltage across the windings within specified limits. Also connected between the primary and secondary windings are several neon lamps 66 which will serve as a bypass in the event of an excessive voltage between the primary and secondary windings of transformer 62. These neon lamps are installed as a protection against transient voltages which may occur when a patient has undergone cardiac arrest and is subjected to high voltage DC defibrillation; however, they will not conduct when power line voltages up to 240 volts AC appear across transformer 62.

Connected in a line from secondary winding 63 is another field effect transistor 67 which acts as a demodulator for the transformed chopped signals. The gate 68 of transistor 67 is connected by means of a conductor 69 to a high frequency source which drives the demodulating transistor as will be explained more fully later. A filter circuit comprising a resistor 70 in parallel with a capacitor 71 is connected to the drain terminal of field effect transistor 67. The demodulated unidirectional signal corresponds with the logarithmically varying signals which are derived from sensor 31 and applied to the input terminals of isolation amplifier 51, and this demodulated signal appears on terminal 72. Discussion of how the signals appearing on terminal 72 are further processed will be deferred for the moment until voltage regulator 55 and its associated circuitry and a sensor condition monitoring and failure responsive circuit are described.

The voltage regulator and its associated field effect transistor driving circuits will now be described. Attention is invited to a high frequency oscillator such as multivibrator 76 which is supplied with power to its terminals 77 from a source, not shown, that is not necessarily isolated from the power mains. Multivibrator 76 is indicated as oscillating at a stable frequency of 25 KHz although other relatively high frequencies might be adopted in other designs. The output voltage from multivibrator 76 is applied to the primary winding 78 of a transformer 79 which has a secondary winding 80. Transformer 79 effectively couples high frequency voltages on its primary with its secondary winding but exhibits high leakage to voltages at power line frequencies. A transformer is selected which will block 60 Hz to such extent that if voltages at such frequencies are applied to the primary winding 78 currents of less than a microampere would be produced in secondary winding 80.

The isolated secondary winding 80 of transformer 79 connects to a full wave rectifier 81 which has the high frequency alternating voltage appearing on its terminals 82 and 83 with respect to ground 84 and DC voltage appearing on its terminals 85 and 86. The DC voltage from terminals 85 and 86 is applied to the input terminals of voltage regulator 55 which includes conventional components for filtering and voltage variation sensing and correction. The output voltage from regulator 55 appears on its output terminals 87, 88 and its floating ground midpoint terminal 89. It should be evident that there is an exceedingly low probability of power line frequencies appearing on voltage regulator terminals 87–89 by virtue of the regulator being isolated from the power lines by transformer 79 and from anything that might attain power line voltage levels. Also, power line voltages appearing at the patient leads 34 and 103 will not find a current path to power line ground through transformer 79. The various components of the signal processing circuitry which must be maintained in a floating condition are supplied with power from terminals 87–89 which are floating and ungrounded.

As indicated earlier, demodulator transistor 67 has its gate 68 connected to the primary winding 78 of transformer 79. Primary winding 78 is not necessarily floating and field effect transistor 67 need not be since the latter is on the secondary side of transformer 62 which isolates transistor 67 and its associated circuitry from the circuit which includes sensor 31 and the body in which it is implanted. Chopper transistor 58, on the other hand, is on the primary side of transformer 62 so its gate 59 is connected by means of a conductor 60 to terminal 82 on the secondary side of high frequency transformer 79. As indicated, the secondary side of transformer 79 is isolated and, hence, so is transistor 58 isolated and floating.

Means for monitoring the electric integrity of sensor 31 before and during use in a patient will now be described. One of the terminals from sensor 31 connects to a tuned circuit 92 by means of a conductor 93. The tuned circuit includes an inductor 94 and a capacitor 95 which are connected in parallel. The circuit, in this example, is tuned to 1,000 Hz. Any device that presents high impedance to a-c and a low impedance to DC may be substituted for the tuned circuit. AC is used for testing because most sensors polarize when DC is applied. The tuned circuit presents a resistance of about 30 ohms or under to the DC derived from the sensor. It, of course, presents a high impedance of about 10,000 ohms at the 1,000 Hz voltage. When the sensor 31 is undergoing its initial electric integrity test and during the time that the sensor is in the body, a 1,000 Hz voltage is applied to the sensor which exhibits capacitance and high dielectric strength as long as membrane 48 is intact. This voltage is derived from an oscillator 96 whose power input terminals 97 are supplied from voltage regulator 55. The oscillator is thus isolated. The oscillator 96 supplies alternating current through the body, the sensor 31 and essentially minimum current through the tuned circuit 92 when the sensor is in use. The oscillator 96 is connected by means of a capacitor 98 to a field effect transistor 99 which has a gate terminal 100. The source and drain terminals of transistor 99 are in series with resistor 101 which connects to sensor test terminal 22 of module 11 and to a body contacting electrode 102 through a conductor 103 which is one of the conductors in the coaxial cable leading from socket 20 of module 11 to the patient. Electrode 102 may be a type which adheres to the body as is commonly used in connection with taking electrocardiographs. Thus a 1,000 Hz current of about 0.5 microampere in this example flows from the oscillator through transistor 99, resistor 101 and electrode 102 from which it flows through the body to sensor 31 and back to tuned circuit 92 or, during testing, from the oscillator through transistor 99, resistor 101 and sensor test terminal 22 through the isotonic electrolyte 37 (FIG. 5) to sensor 31 and back to tuned circuit 92. This causes a potential of about 20 mv rms to be developed across tuned circuit 92 when the membrane 48 of sensor 31 is intact and has its normal good dielectric properties. Field effect transistor 99 is normally biased to act as a low variable resistance which limits current to the body to under 3 microamperes.

If the dielectric properties of sensor 31 are degraded such as by rupture or the occurrence of a leak in membrane 48, the 1,000 Hz current will tend to increase but will be reduced and held to a low value under 3 microamperes by the action of the field effect transistor 99 which acts as a variable resistor. This results from applying an increased biasing voltage to the gate 100 of transistor 99 coincident with a reduction of resistance through the body circuit including the sensor. There is also protection for the circuit elements in the event of defibrillation by virtue of another neon lamp 105 being connected between the 1,000 Hz source and floating ground. There is further protection for the circuit elements by way of a pair of oppositely connected zener diodes 104 and a current limiting resistor 101 which are connected with a terminal of transistor 99.

Potentials developed across tuned circuit 92 are applied to an operational amplifier 106 whose power terminals 107 and 108 are supplied from the output terminals of floating voltage regulator 55. This amplifier has a feedback circuit which is merely symbolized by a conductor 109 since its characteristics may be devised by a skilled electronics designer and would depend on the particular amplifier used. The amplifier 106 may have a gain of about 30, for instance. Its amplified output signals are coupled through a capacitor 110 to a comparator amplifier 115. There is a diode 111 and a current limiting resistor 114 connected to the input terminal of comparator 115. The output signals from amplifier 106 are subjected to some filtration by the combined action of resistor 112 and a capacitor 113. It should be evident that when the output voltage signals from amplifier 106 increase, due to increased potential across tuned circuit 92, a voltage increasing toward pinch-off will be applied to gate terminal 100 of variable resistance type field effect transistor 99 which was mentioned in the preceding paragraph. This voltage is developed across a resistor 116 which is supplied through a pair of series connected diodes 117. Thus, as the voltage from amplifier 106 increases, the gate voltage on transistor 99 will be raised toward pinch-off so its resistance will increase and its conductivity will be reduced. This limits current through the body to an acceptable level such as below 3.0 microamperes if the sensor breaks down during use.

Comparator 115 is for comparing the output signal of amplifier 106 with a reference voltage and for producing a warning signal when there is a significant voltage change incidental to sensor failure. The reference voltage source for comparator 115 comprises a voltage divider having series connected resistors 130 and 130' connected to floating ground at one end and having the other end terminal 118 connected to the positive terminal of floating voltage regulator 55. An intermediate point of the voltage divider is connected to a current limiting resistor 119 to an input terminal of comparator 115. The reference voltage developed on this input terminal is stable.

The comparator 115 has power supply terminals 120 and 121 which are supplied from floating voltage regulator 55. The output circuit of comparator 115 includes a diode 122 whose cathode is connected to the base of a transistor 123. The collector of transistor 123 is supplied through a terminal 124. The collector-emitter circuit of transistor 123 includes a relay coil 125 which is insufficiently energized during operation of a normal and operative sensor to close its relay switch contacts 126. However, if sensor 31 fails, the output of comparator 115 rises, thereby increasing the conductivity of transistor 123 and causing relay coil 125 to operate and close its contacts 126. Upon this event, a warning lamp 127 goes on to provide a visual indication of sensor failure. The voltage for driving indicator lamp 127 may be applied to terminal 128 from any suitable low voltage DC source.

A feedback circuit 129 associated with comparator 115 is shown in block form. This feedback is in the nature of a relaxation oscillator or a blinker which alternately conducts and discharges so as to apply and remove the potential from relay coil 125, thereby causing indicating lamp 127 to blink. A failure that causes high conductivity through sensor 31 increases the output of comparator 115 and causes indicating lamp 127 to blink at a higher rate.

Figure 2:
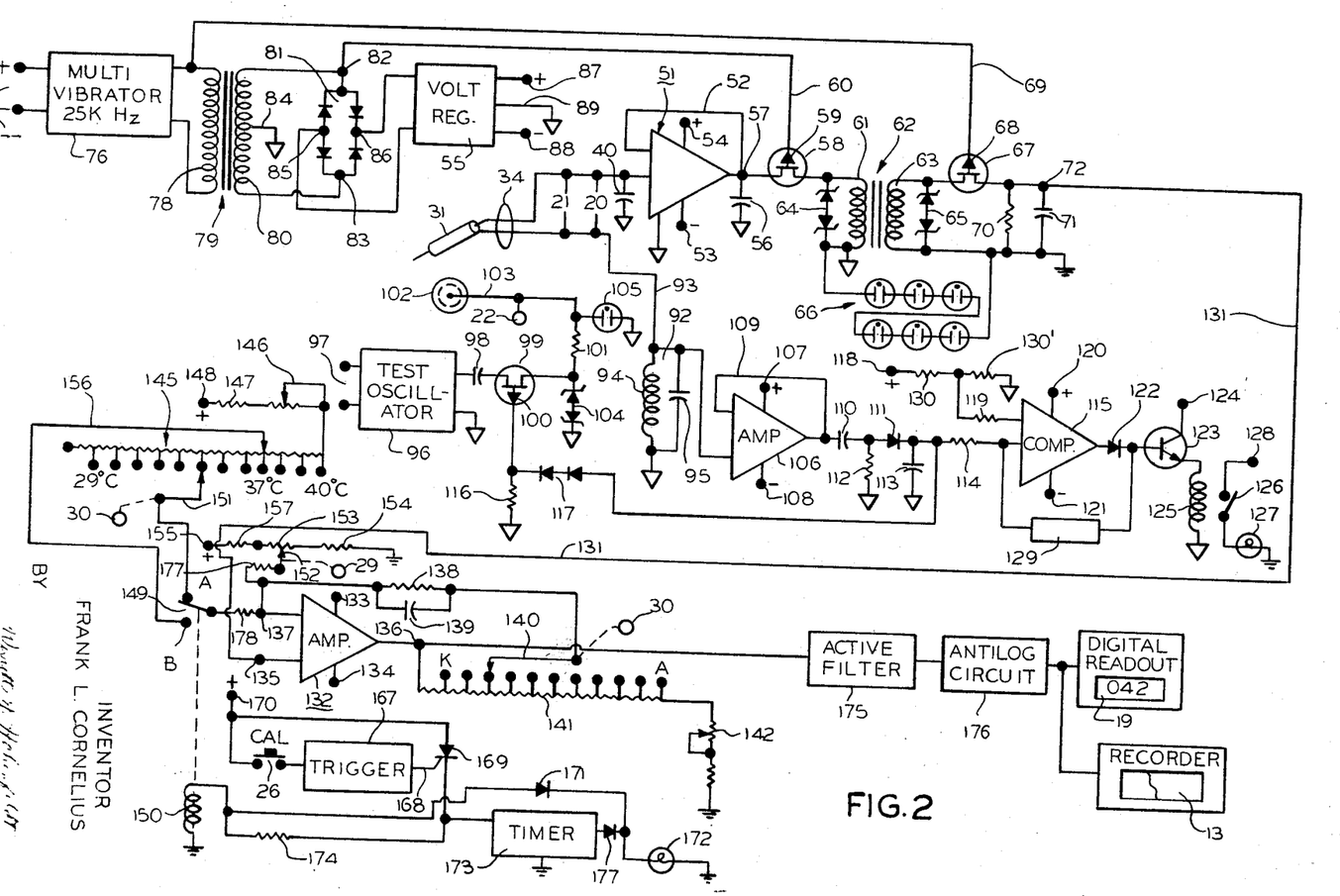
FIG. 2 is a schematic circuit diagram of the monitor with a blood gas sensor connected.

The sensor integrity testing and checking circuit may be connected slightly differently than shown in FIG. 2. For instance, drain terminal of transistor 99 could be connected directly to the top of tuned circuit 92 in which case the tuned circuit should be disconnected from amplifier 106. The cathode of top zener diode 104 of body contacting electrode circuit 103 should then be connected to the input of amplifier 106 and a fixed circuit element such as a load resistor, capacitor or a tuned circuit may be connected to floating ground from the amplifier 106 input. The voltage developed across the fixed element will then be representative of sensor impedance. The voltage developed across terminals 20 and 21 with suitable load 40 will represent impedance changes due to body temperature variations. This voltage may be processed to produce a temperature compensating signal or it may be used in other ways.

A description of the sensor signal processing system will now be resumed. The unidirectional, demodulated, logarithmically varying sensor signals are conducted from demodulator transistor 67 and terminal 72 over a wire 131 to an amplifier 132. The power to terminals 133 and 134 of amplifier 132 may be supplied from any suitable DC source since this part of the circuitry is not floating. Amplifier 132 is involved in calibrating the sensor and in producing output signals which are converted to a readable form.

Amplifier 132 has several inputs to which various circuits are connected for adjusting the gain and bias of the amplifier. Adjustment for inherent sensor gain will now be considered. Connected between an output terminal 136 from amplifier 132 and an input terminal 137 is a feedback circuit which includes a resistor 138 shunted by a capacitor 139. These elements are in series with a wiper arm 140 which may be moved by operating control knob 30 on module 11 for selective contact with any of the stationary contacts A - K which are connected to points intermediate a tapped resistor 141. Resistor 141 in conjunction with a trimming variable resistor circuit 142 acts as a voltage divider which can be adjusted by moving wiper arm 140 to vary the feedback of amplifier 132 and thereby set its gain at a desired level. Recall the earlier discussion of how the package of each sensor is marked with a letter after manufacture to classify it in respect to its inherent gain and to properly match it with the amplifier 132. As indicated earlier, at the initiation of the calibration procedure, knob 30 on module 11 is turned to a position where its indicator mark agrees with one letter on the front panel which is the same as the inherent gain classification letter marked on the sensor package. This effects selecting a corresponding letter on a tap of the divider resistor 141 and sets the feedback and gain of amplifier 132 as described.

It is desirable to calibrate all sensors at a fixed temperature such as average body temperature 37° C. It is necessary to set the zero of amplifier 132 or to subtract a voltage at the input of amplifier 132 to correspond with this sensor temperature during calibration. Sensors of this type have a temperature coefficient and must be compensated at different temperatures. A voltage divider is provided for establishing the proper temperature compensating bias voltage on amplifier 132. The divider comprises a series of resistors 145 which are tapped at intermediate points to provide contacts which are labeled in FIG. 2 to correspond with temperatures ranging from 29° to 40° C. In series with resistors 145 is a trimming resistor 146 and a fixed resistor 147 which connects to a power terminal 148. The resistor tap marked 37° C connects directly by means of conductor 156 to one input terminal of amplifier 132 through a switch 149 and a summing resistor 178 during sensor calibration so calibration always occurs at 37° C. This situation exists when the switch is in contact with its B terminal. As will be explained subsequently, switch 149 is operated by a relay coil 150. When calibration is initiated, relay coil 150 is energized so as to transfer switch 149 to its B contact and apply a voltage representative of 37° C temperature to the input of amplifier 132. When calibration is complete, relay 150 is de-energized and switch 149 is transferred to its A position automatically, in which case the signal is applied through the A terminal and summing resistor 178. After, or even before calibration, the wiper 151 of voltage divider 145 is transferred to a tap that corresponds with the prevailing temperature of the patient's body. This temperature setting is accomplished by turning one of the dual knobs 30 on the front panel of module 11. The knob effectively controls wiper 151.

Assuming that during calibration amplifier 132 is getting a fixed bias signal from the 37° C tap of divider 145 and that the inherent gain correction for sensor 31 has been made by adjusting feedback with wiper 140, it is then appropriate to adjust the zero, bias or offset of amplifier 132 or to subtract a voltage at the amplifier so that the partial pressure of gas displayed by the digital readout meter 19 corresponds with the partial pressure of the gas in isotonic electrolyte 37 within plastic tube 36 which encases the sensor during calibration. This step of sensor calibration is accomplished by turning Cal knob 29 on the front panel of module 11 so as to effect operation of a wiper 152 which is shown located above amplifier 132 in FIG. 2. The wiper cooperates with a resistor 153 which is in series with fixed resistors 154 and 157 that are connected between ground and a voltage supply terminal 155. Voltage on the wiper 152 is applied to the amplifier input through a summing resistor 177. Since the fluid electrolyte 37 within plastic tube 36 is equilibrated to correspond with a carbon dioxide partial pressure of 42 millimeters of mercury in this example, the bias of amplifier 132 may be adjusted by means of knob 29 until this value appears on the digital readout 19. Of course, the sensor could be equilibrated at other partial pressures as long as they are always consistent for calibration.

Figure 6:
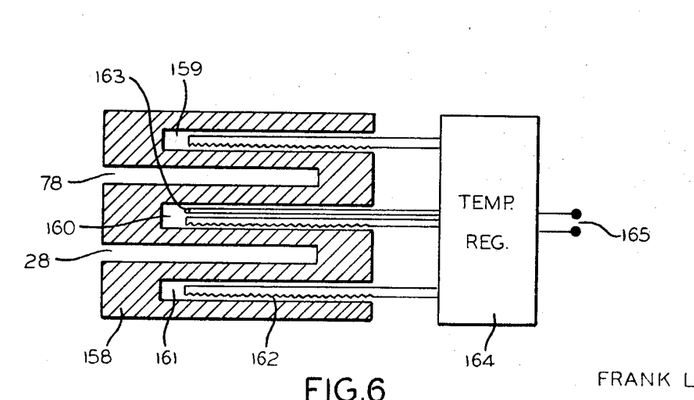
FIG. 6 depicts in cross section a sensor heater block which is built into the monitor and used to stabilize the temperature of the sensor for calibration purposes.

Calibration of all sensors at a uniform temperature is accomplished by depositing a tube-encased sensor in one of the heater sockets 28 which are shown on the front panel of module 11 and are in the heater block 158 depicted in FIG. 6. This heater block has three recesses 159 – 161 in which there are individual resistive heater elements such as 162 in recess 161. There is a thermistor temperature sensor 163 in at least one of the recesses such as 160. A temperature regulator 164 from which the resistive heating elements are supplied is controlled by thermistor 163. The heaters may be supplied with low voltage AC such as from the input terminals 165 which are in circuit with the regulator contacts, not shown. When the sensor to be calibrated is in one of the sockets 28, momentary contacting calibration switch 26 is depressed on the front panel of module 11. This switch is also shown in FIG. 2. Momentary contact by switch 26 energizes a time delay and triggering circuit which is shown in block form and labeled 167 in FIG. 2. This event supplies a triggering voltage to the gate terminal 168 of a controlled rectifier 169 which is thereby rendered conductive to start a timing interval. When rectifier 169 is conductive, a circuit is completed from a low voltage line terminal 170 through rectifier 169, resistor 174 and relay coil 150. This effects transfer of switch 149 to its B contact. Also, when controlled rectifier 169 is conductive a circuit is completed through resistor 174, diode 171 and indicator lamp 172. The voltage drop across resistor 174 causes indicator lamp 172 to burn at something less than full brightness during this timing interval. Conduction through controlled rectifier 169 also energizes a timer 173. After about 5 minutes elapse, during which time the sensor and the isotonic electrolyte in tube 36 are certain to be at a temperature of 37° C, timer 173 acts to apply full voltage to indicator lamp 172 which then burns at full brightness. Upon this event, the wiper 152 of the gain control circuit can be adjusted with knob 29 on the front panel of module 10 so that the digital readout 19 is at the predetermined value corresponding with the known partial pressure of the gas in the isotonic electrolyte. After another few minutes, timer 173 functions to de-energize relay coil 150, causing switch 149 to transfer to its A contact so that amplifier 132 is corrected for whatever corresponding body temperature wiper 151 is set on and indicator lamp 172 goes off. As soon as the sensor 31 is calibrated, it is withdrawn from sterile tube 36 and inserted through a cannula so that its distal end is exposed to flowing blood in which case the sensor will produce a readout on the digital display 19 which corresponds with the partial pressure of the blood gas which the sensor is designed to sense.

The varying output voltage from amplifier 132 is processed in an active filter 175 from which it is delivered to a conventional antilogarithm circuit 176 so that the ensuing digital readout device 19 will read linearly with respect to the signals produced by sensor 31 rather than as a logarithmic function thereof.

As indicated earlier, prior to proceeding with calibration, the sensor is tested for electric integrity and discarded if it is defective. In reference to FIG. 2, this very important step is accomplished by contacting the metalized end 39 of fluid-filled tube 36 on a terminal 22 which is similarly shown and labeled in FIG. 1. This is equivalent to contacting the tip of sensor 31 in FIG. 2 directly onto terminal 22. If the sensor is defective under this test, the potential on tuned circuit 92 will change and cause failure indicator lamp 127 to glow brightly as previously described.

To recapitulate the calibrating procedure, the sensor is removed from its envelope and the metalized end of the tube encasing the sensor is contacted on terminal 22. If there is no indication of sensor defect, the tube-encased sensor is deposited in a heater socket and brought up to body temperature. The gain of the last stage amplifier 132 is then adjusted for inherent gain variations between sensors as determined by the letter markings on the sensor package. The calibration switch 26 is depressed and indicator lamp 27 goes on at partial brightness. Bias or offset in accordance with temperature is automatically controlled. After 5 minutes indicator lamp 27 goes on at full brightness. The calibration knob 29 is then turned to set the bias of the amplifier 132 so that the partial pressure exhibited by digital readout 19 agrees with the known partial pressure of the gas in the test fluid within tube 36. The tube 36 is then removed and the sensor is inserted in the body at which time the gain of the amplifier is adjusted for existing body temperature by means of control knob 30. The sensor may remain in the body during the several hours required for surgery or even for days when continuous monitoring is required. It is not contemplated that the sensor will be sterilized and reused but that it will be thrown away after use in an individual patient. Although the new apparatus and calibrating procedure has been described in considerable detail with respect to use with one type of sensor using a membrane, such description is to be construed as illustrative rather than limiting for the invention may be variously embodied and used and is to be limited only by construing the claims which follow.

I claim:

1. For use with a sensor which responds to partial pressure of a gas in a body fluid of a patient to produce a signal representative of the partial pressure and which has a predetermined electrical impedance in its normal condition, a monitor comprising:
   a. terminal means for connection to the sensor
   b. sensor signal processing means having an input connected with said terminal means and adapted to produce a signal corresponding with partial pressure of the gas,
   c. test oscillator means adapted for being connected to the body of the patient to impose a substantially constant alternating voltage from the oscillator means on the sensor,
   d. a circuit means connected to said terminal means to develop a signal whose magnitude depends on the impedance of the sensor to the alternating voltage,
   e. means responsive to signal variations from said circuit means which correspond with a change in the impedance of the sensor, and
   f. means which respond to said last-named means to produce a signal indicative of said impedance change.

2. The monitor set forth in claim 1 including:
   a. a test terminal connected to said test oscillator means,
   b. said test terminal being exposed for being contacted by the sensor when it is not implanted in the body, to thereby impose alternating voltage from said test oscillator means on the sensor for checking its electrical integrity.

3. The monitor set forth in claim 2 further including:
   a. a variable resistance device connected in circuit with said oscillator means and said test terminal, the resistance of said device depending on its bias voltage, and
   b. an amplifier responsive to the signal magnitude on said circuit means to produce an output signal that is proportional to said signal magnitude and is applied to said variable resistance device to change its bias voltage and increase its resistance, whereby to limit current through the sensor if the sensor is in abnormal condition.

4. The monitor set forth in claim 3 wherein:
   a. said variable resistance device is a field effect transistor having a source, a drain and a gate terminal, and
   b. said amplifier has its output signal supplied to said gate terminal to control the resistance of said transistor.

5. The monitor set forth in claim 1 wherein:
   a. said circuit means is a tuned circuit and has a low impedance for signals produced by the sensor in response to the partial pressure of the gas and has a high impedance for the signals at said test oscillator frequency.

6. For use with a sensor which responds to partial pressure of a gas in a body fluid of a patient to produce a signal representative of the partial pressure and which has a predetermined electrical impedance in its normal condition, a monitor comprising:
   a. first terminals for connection with the sensor,
   b. amplifier means amplifying the signal produced by the sensor and having input terminals one of which is connected with one of said first terminals,
   c. a device which has low impedance for unidirectional sensor signals and higher impedance for alternating signals, said device being in circuit between another of said first terminals and another input terminal of said amplifier means,
   d. means producing a variable control signal in response to corresponding variations of the alternating signal on said device,
   e. an oscillator producing an alternating test signal,
   f. an electrode for connection to the body of the patient, and g. a terminal in the output circuit of said oscillator connected to said electrode for applying the alternating test signal to a circuit including the sensor and said device, whereby said control signal producing means will be varied in correspondence with variations in the impedance of the sensor.

7. The monitor set forth in claim 6 further including:
a. a field effect transistor having source and drain terminals in said oscillator output circuit and having a gate terminal that is connected to receive said control signal, said control signal being effective to increase the resistance between said source and drain terminals in response to an increasing alternating test signal on said device corresponding with decreased impedance of the sensor.

8. The monitor set forth in claim 6 wherein:
a. said device is a parallel resonant tuned circuit which produces voltage variations in correspondence with variations in the impedance of the sensor to said alternating test signal.

9. The monitor set forth in claim 6 further including:
a. signal chopper means receiving an output signal from said amplifier means,
b. demodulator means,
c. a first transformer having a primary winding receiving the signal from the chopper means and a secondary winding delivering the signal to the demodulator means wherein said chopped signal is converted to a demodulated signal which corresponds to the partial pressure sensed by the sensor, said primary winding having a floating ground,
d. a source of high frequency voltage,
e. a second transformer having a primary winding connected to said source and a secondary winding having a floating ground,
f. voltage from the secondary winding of the second transformer being applied to drive said chopper means at a potential referenced to floating ground and otherwise isolated from ground by said transformers.

10. The monitor set forth in claim 9 further including:
a. a full wave rectifier means having alternating voltage supply terminals and DC terminals, said alternating voltage supply terminals being connected to the secondary winding of said second transformer,
b. a voltage regulator means connected to said DC terminals of said rectifier means, said regulator means having a floating ground and output terminals for supplying power to said amplifier means.

11. The monitor set forth in claim 9 further including:
a. a second amplifier means having an output terminal and input terminals and being adapted for multiple gain control and having one of its input terminals connected to receive said demodulated signal,
b. a feedback circuit between said output terminal of said second amplifier means and another of its input terminals, said circuit including a resistor that is adjustable to control the gain of the amplifier in accordance with the predetermined inherent gain of the sensor incidental to calibration thereof,
c. a voltage divider having taps representative of the temperature of the sensor and means to apply a voltage appearing on a selected one of said taps to said another of said input terminals of said second amplifier means to control the amplifier bias in accordance with the sensor temperature, and
d. a bias calibrating voltage divider which has a tap that is adjustable and connected to said another of said input terminals of said second amplifier means for introducing a voltage thereto which modifies the output signal of said second amplifier means to correspond with a predetermined partial pressure of the gas in the liquid in which the sensor is immersed during calibration, and
e. a readout means driven by the output signal from said second amplifier means.

12. The monitor set forth in claim 6 including:
a. a comparator amplifier having one input terminal and a reference voltage connected thereto and another input terminal receiving said control signal, the output signal of said comparator amplifier being the amplified difference between the reference voltage and the control signal,
b. means operable by said last-named output signal when it reaches a predetermined magnitude due to an abnormal condition of the sensor, and
c. a signal means responsive to operation of said last-named means for indicating said abnormal condition.

* * * * *